US010103528B2

(12) United States Patent
Lewinski

(10) Patent No.: US 10,103,528 B2
(45) Date of Patent: Oct. 16, 2018

(54) CABLE DUCT

(71) Applicant: HellermannTyton Corporation, Milwaukee, WI (US)

(72) Inventor: Giovanni Lewinski, Milwaukee, WI (US)

(73) Assignee: HELLERMANNTYTON CORPORATION, Milwaukee, WI (US)

(*) Notice: Subject to any disclaimer, the term of this patent is extended or adjusted under 35 U.S.C. 154(b) by 0 days.

(21) Appl. No.: 15/634,345

(22) Filed: Jun. 27, 2017

(65) Prior Publication Data
US 2018/0006440 A1 Jan. 4, 2018

Related U.S. Application Data

(60) Provisional application No. 62/357,132, filed on Jun. 30, 2016.

(51) Int. Cl.
H02G 3/04 (2006.01)
(52) U.S. Cl.
CPC ......... H02G 3/0437 (2013.01); H02G 3/0418 (2013.01)
(58) Field of Classification Search
CPC ................... H02G 3/0437; H02G 3/0418
USPC ........................................ 174/68.1
See application file for complete search history.

(56) References Cited

U.S. PATENT DOCUMENTS

| 4,942,271 | A | 7/1990 | Corsi et al. | |
| 5,669,106 | A | 9/1997 | Daoud | |
| 5,728,976 | A | 3/1998 | Santucci et al. | |
| 5,942,729 | A * | 8/1999 | Carlson, Jr. .......... | H02G 3/0418 174/66 |
| 6,084,180 | A | 7/2000 | DeBartolo et al. | |
| 6,107,576 | A | 8/2000 | Morton et al. | |
| 6,333,461 | B1 | 12/2001 | Marcou et al. | |
| 6,410,855 | B1 | 6/2002 | Berkowitz et al. | |
| 6,437,243 | B1 * | 8/2002 | VanderVelde ........ | H02G 3/0418 174/101 |
| 6,437,244 | B1 | 8/2002 | Vander Velde | |
| 6,792,877 | B2 | 9/2004 | Gutgsell et al. | |
| 6,835,891 | B1 | 12/2004 | Herzog et al. | |
| 6,903,265 | B1 | 6/2005 | VanderVelde et al. | |
| 6,916,986 | B1 | 7/2005 | Herzog et al. | |

(Continued)

FOREIGN PATENT DOCUMENTS

EP 2091119 A2 8/2009

Primary Examiner — Dhirubhai R Patel
(74) Attorney, Agent, or Firm — Robert J. Myers

(57) ABSTRACT

An cable duct is presented herein. The cable duct includes a cover plate having a double sided hinge allowing the cover to be opened from one of two sides. The cover has a pair of saddle features longitudinally extending along distal edges of the cover plate, a base plate arranged opposite the cover plate, and a sidewalls extending from the base plate to the cover plate. Each sidewall defines a lobe mechanism on a sidewall end opposite the base plate that is configured to engage the corresponding saddle feature releasably secure the cover plate to the sidewall. Each saddle feature is configured to pivot about the lobe mechanism. Each lobe mechanism includes a rounded outer lobe portion having a first radius and a rounded inner lobe portion having a second radius. The first radius is greater than the second radius.

36 Claims, 4 Drawing Sheets

(56) References Cited

U.S. PATENT DOCUMENTS

| | | |
|---|---|---|
| 7,041,897 B2 | 5/2006 | Herzog |
| 7,060,901 B2 | 6/2006 | Herzog et al. |
| 7,113,685 B2 | 9/2006 | Ferris et al. |
| 7,224,880 B2 | 5/2007 | Ferris et al. |
| 7,304,240 B1 | 12/2007 | Gretz |
| 7,326,863 B2 | 2/2008 | Herzog |
| 7,411,126 B2 | 8/2008 | Herzog et al. |
| 7,612,300 B2 | 11/2009 | Owens et al. |
| 7,615,710 B2 | 11/2009 | Sayres |
| 7,829,797 B2 | 11/2010 | VanderVelde et al. |
| 8,220,243 B2 | 7/2012 | Komiya et al. |
| 8,530,744 B2 | 9/2013 | Caveney et al. |
| 8,598,456 B2 | 12/2013 | Carbone et al. |
| 8,807,490 B2 | 8/2014 | Komiya |
| 2005/0263309 A1 | 12/2005 | VanderVelde et al. |
| 2009/0032651 A1 | 2/2009 | Sayres |

* cited by examiner

CABLE DUCT

CROSS-REFERENCE TO RELATED APPLICATION

This application claims the benefit under 35 U.S.C. § 119(e) of U.S. Provisional Patent Application No. 62/357,132 filed on Jun. 30, 2016, the entire disclosure of which is hereby incorporated by reference.

TECHNICAL FIELD OF INVENTION

The present invention relates to wiring and cable duct assemblies and in particular to a modular cable duct assembly or cable duct for use inside electrical panels and electrical cabinets, or other hard-to-reach applications. More particularly, the invention provides a cable duct assembly that is easy to open, and yet is resistant to accidental closing.

BACKGROUND OF THE INVENTION

Various cable duct hinges are known in the prior art. Some include a hinge mechanism on releasable both sides of the cable duct cover, i.e. the cover can be opened from either side of the cable duct. The cover is attached to the base hinge mechanism by a snap-lock mechanism.

Other known cable duct hinges include a cover with J shaped ends and an inwardly directed flange, the J shape end and flange defining a cavity that receives the edge of the sidewall. The hook-and-flange mechanism exerts a preload pressure that can hold the cable duct cover in a variety of positions from closed to fully-open.

Yet other designs for cable duct hinges have a hinge mechanism defined by a circular pivot member that is received by a socket member on the sidewall of the cable duct. A groove on either side of the circular pivot member receives the arms of the socket member to limit rotation.

Another cable duct hinge design includes a cover member with a planar member, intermediate member, and a distal member at the end of the cover to define a space that receives the distal end of the sidewall. The planar member, intermediate member, and distal member all include detent steps that allow the cover to rest at a 15° open position as well as a 90° open position.

One of the drawbacks of existing cable duct hinges is that when working within a cable duct with the cover open, it is easy to inadvertently knock down or close the cover, especially in confined or hard-to-reach spaces. Another drawback is the limited range of motion of the cover, preventing opening of the cover beyond 90°. Therefore, there exists a need for a cable duct hinge that offers greater than 90° cover rotation and a means to defeatably but firmly lock the cover in the full open position to prevent inadvertent cover closing.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

Devices made in accordance with this invention have particular application in electrical cabinets and electrical panels to route and retain electrical wires, particularly in applications that are in hard to reach or confined spaces. The present invention relates more specifically to cable duct designs with a rectangular cross-section that include a cover piece that pivots about the sidewall of the cable duct. The present invention overcomes the shortcomings of conventional cable duct assemblies at least by providing a hinge mechanism that prevents inadvertent closing of the cable duct cover.

The invention includes a saddle feature, that extends longitudinally along on the ends of the cable duct cover and a corresponding lobe mechanism on the distal ends of the cable duct sidewall fingers to create a hinge. The saddle and lobe hinge features allows for easy snap-on installation of the cable duct cover. The cover can be unsnapped from either side, utilizing the saddle-lobe hinge of the side remaining connected. Throughout cover rotation, the saddle arms transition from relaxed to in tension as the arms rotate over the lobe, completing rotation in a locking mechanism. In the first position of cover rotation, the saddle arms are relaxed, allowing the cover to freely pivot with respect to the attached cover end. In the second position of rotation, the saddle arms of the cover portion of the hinge apply a force against the lobe mechanism that allows the cover to remain open. In the third position of rotation, the cover locks into a 105° open position, allowing the user to freely access the cables contained within the cable duct without inadvertent closing of the cable duct cover.

Projections on the distal ends of the saddle arms, in combination with a detent step and surface bulge structure on the lobe, create the locking mechanism for the cover. The exact placement of these features on the saddle structure and lobe structure allow the cover to be locked in the 105° open position. It should be noted that this position can be changed or varied without departing from the present invention.

The cable duct sidewall sections are preferably 30.5 cm (12 in.) and are available in a variety of heights. Preferably, the sidewalls are injection molded to provide smooth edges (radii) around all the outside corners, which is a dramatic improvement over the sharp edges of the prior art's extruded and punched wall sections that can chafe wires and cable routed through the fingers. The sidewalls of the cable duct are preferably comprised of finger structures which are connected together by a stem structure. Sidewalls can also be comprised of various slot or hole patterns in addition the finger features. The fingers have restricting nubs to hold cable wires, which run between the fingers, in a known position, and necked break-off points where the fingers connect to the finger stem to allow easy removal of the fingers from the sidewall without the use of tools. The finger stem has a mating geometry to facilitate installation of the sidewalls into a space defined by an inner and outer base rail on the base plate and increase pull-out resistance. The sidewall sections are preferably interchangeable and replaceable as part of modular assembly.

Further, the base plate preferably includes staggered mounting slots, a cable tie mounting buckle, and score lines that facilitate the removal of all or part of the receiving space between inner and outer base rails to create a smooth surface for the perpendicular abutment of another cable duct. Preferably, the base plate and cover plate are produced in extruded, 183 cm (72 in.) lengths.

Further, the invention contemplates at least two different designs of the lobe mechanism. In one lobe design, the lobes at the distal end of the sidewalls are a uniform solid shape. In another lobe design, the outer facing section of the lobe mechanism has a portion that is hollowed out. The hollowed out lobe provides a uniform thickness throughout the lobe mechanism, which generates less heat buildup during molding, translates to shorter production cycle times, and reduces the material used for production. The hollowed 1 lobe mechanisms have an identical profile to the non-hollowed lobe mechanisms and therefore function in a substantially similar way.

It is, therefore, an object of the present invention to provide an improved cable duct cover hinge design.

Another object of the present invention is to provide and easy to install snap-on cable duct cover that can pivot with respect to either sidewall.

More specifically, the cover attaches to the sidewalls of the cable duct through the mating of a saddle and a lobe. The saddle arms transition from relaxed to in tension as the saddle rotates over the lobe.

Yet another object of the present invention is to provide a three position cable duct cover hinge that locks in the 105° open position to prevent inadvertent closing of the cable duct cover.

Another object of the present invention is to provide a cable duct with sidewalls comprised of fingers that can twist off below the base rail, a base plate with cable duct mounting slots, and a sidewall stem geometry that is received into a space defined by inner and outer base rails to increase pull-out resistance.

In accordance with an embodiment of the invention, cable duct defining a cavity configured to retain an elongate conductor, e.g. a wire electrical cable, is provided. The cable duct includes a cover plate defining a first saddle feature longitudinally extending along a first distal edge of the cover plate and a second saddle feature longitudinally extending along a second distal edge of the cover plate opposite the first distal edge and a base plate arranged opposite the cover plate. The cable duct also includes a first sidewall extending from a longitudinal edge of the base plate to the cover plate. The first sidewall defines a first lobe mechanism on a first sidewall end opposite the base plate configured to engage the first saddle feature and releasably secure the cover plate to the first sidewall. The first saddle feature is configured to pivot about the first lobe mechanism. The cable further includes a second sidewall extending from another longitudinal edge of the base plate to the cover plate. The second sidewall defines a second lobe mechanism on a second sidewall end opposite the base plate configured to engage the second saddle feature and releasably secure the cover plate to the second sidewall. The second saddle feature is configured to pivot about the second lobe mechanism. Each of the first and second lobe mechanisms include a rounded outer lobe portion having a first radius and a rounded inner lobe portion having a second radius, and wherein the first radius is greater than the second radius.

The first lobe mechanism is a mirror-image of the second lobe mechanism and the first saddle feature is a mirror image of the first saddle feature.

The first lobe mechanism defines a detent step intermediate the outer lobe portion and the inner lobe portion. The first lobe mechanism is attached to the first sidewall by a serpentine portion having a first curved portion that is inwardly angled toward a center of the cable duct and a second curved portion that curves outwardly away from the center of the cable duct. The serpentine portion defines a longitudinal channel intermediate the first sidewall and the first lobe mechanism. The first saddle feature is characterized as having a C-shape and defines a first saddle arm and a second saddle arm. The first lobe mechanism is received in a saddle cavity defined between the first and second saddle arms. The first saddle feature is configured to pivot from a closed position in which the first lobe mechanism is engaged with the first saddle feature and the second lobe mechanism is in contact with, but not engaged with, the second saddle feature to a partially open position in which the second lobe mechanism is disengaged from the second saddle feature and an end of the first saddle arm is disposed within the longitudinal channel. A first force is required to be applied to the cover plate to move the first saddle feature from the closed position to the partially open position. The first and second saddle arms are not in tension as the first saddle feature is moved from the closed position to the partially open position. The first saddle feature rotates through an angle of about 90 degrees between a locked position, in which the first lobe mechanism is engaged with the first saddle feature and the second lobe mechanism is engaged with the second saddle feature, and the partially open position. The first saddle feature is further configured to pivot from the partially open position to a fully open position in which an end of the second saddle arm is in contact with the detent step and the end of the first saddle arm is disposed within the longitudinal channel. A second force, greater than the first force, is required to be applied to the cover plate to move the first saddle feature from the partially open position to the fully open position. The first and second saddle arms are in tension as the first saddle feature is moved from the partially open position to the fully open position. The first saddle feature rotates through an angle of about 105 degrees between a locked position, in which the first lobe mechanism is engaged with the first saddle feature and the second lobe mechanism is engaged with the second saddle feature, and the fully open position.

The second lobe mechanism defines a detent step intermediate the outer lobe portion and the inner lobe portion. The second lobe mechanism is attached to the second sidewall by a serpentine portion having a first curved portion that is inwardly angled toward a center of the cable duct and a second curved portion that curves outwardly away from the center of the cable duct. The serpentine portion defines a longitudinal channel intermediate the second sidewall and the second lobe mechanism. The second saddle feature is characterized as having a C-shape and defines a first saddle arm and a second saddle arm. The second lobe mechanism is received in a saddle cavity defined between the first and second saddle arms. The second saddle feature is configured to pivot from a closed position in which the second lobe mechanism is engaged with the second saddle feature and the first lobe mechanism is in contact with, but not engaged with, the first saddle feature to a partially open position in which the second lobe mechanism is disengaged from the second saddle feature and an end of the second saddle arm is disposed within the longitudinal channel. A first force is required to be applied to the cover plate to move the second saddle feature from the closed position to the partially open position. The first and second saddle arms are not in tension as the second saddle feature is moved from the closed position to the partially open position. The second saddle feature rotates through an angle of about 90 degrees between a locked position, in which the second lobe mechanism is engaged with the second saddle feature and the first lobe mechanism is engaged with the first saddle feature, and the partially open position. The second saddle feature is configured to pivot from the partially open position to a fully open position in which an end of the second saddle arm is in contact with the detent step and the end of the first saddle arm is disposed within the longitudinal channel and wherein a second force, greater than the first force, is required to be applied to the cover plate to move the second saddle feature from the partially open position to the fully open position. The second saddle feature rotates through an angle of about 105 degrees between a locked position, in which the second lobe mechanism is engaged with the second saddle feature and the second lobe mechanism is engaged with the second saddle feature, and the fully open position. The first and second saddle arms are in tension as the first saddle feature is moved from the partially open position to the fully open position.

The first sidewall comprises a first plurality of fingers defining a gap therebetween, each finger in the first plurality of fingers defining the first lobe mechanism on a first finger end opposite the base plate and wherein the second sidewall comprises a second plurality of fingers defining a gap therebetween, each finger in the second plurality of fingers defining the second lobe mechanism on a second finger end opposite the base plate. Each first lobe mechanism and each second lobe mechanism contains a hollowed out section such that the hollowed first and second lobe mechanisms have a uniform wall thickness. Each finger in the first plurality of fingers and each finger in the second plurality of fingers define restrictor features configured to keep electrical wiring that is threaded between the fingers in a known position. Each finger in the first plurality of fingers and each finger in the second plurality of fingers define a break-off point include a chamfered neck allowing the finger to be twisted off and removed from the first or second sidewalls.

The base plate defines an inner base rail and an outer base rail and wherein the first and second side walls define a locking feature received intermediate the inner and outer base rails. The base plate defines a plurality of cable duct mounting slots staggered to provide a variety of mounting points along the base plate. The base plate defines a plurality of cable tie mounting buckles configures to secure a wire cable to the base plate. The base plate defines a plurality of score lines along the bottom of base plate to provide a mechanism for removal of a section of the inner base rail and the outer base rail.

In accordance with another embodiment of the invention, cable duct defining a cavity configured to retain an elongate conductor, e.g. a wire electrical cable, is provided. The cable duct includes a cover plate defining a first hinge mechanism longitudinally extending along a first distal edge of the cover plate and a second hinge mechanism longitudinally extending along a second distal edge of the cover plate opposite the first distal edge and a base plate arranged opposite the cover plate. The cable duct also includes a first sidewall extending from a longitudinal edge of the base plate to the cover plate. The first sidewall defines a first lobe mechanism on a first sidewall end opposite the base plate configured to engage the first hinge mechanism and releasably secure the cover plate to the first sidewall. The first hinge mechanism is configured to pivot about the first lobe mechanism. The cable duct further includes a second sidewall extending from another longitudinal edge of the base plate to the cover plate. The second sidewall defines a second lobe mechanism on a second sidewall end opposite the base plate configured to engage the second hinge mechanism and releasably secure the cover plate to the second sidewall. The second hinge mechanism is configured to pivot about the second lobe mechanism.

The first sidewall comprises a first plurality of fingers defining a gap therebetween, each finger in the first plurality of fingers defining the first lobe mechanism on a first finger end opposite the base plate. The second sidewall also comprises a second plurality of fingers defining a gap therebetween. Each finger in the second plurality of fingers defining the second lobe mechanism on a second finger end opposite the base plate. Each finger in the first plurality of fingers and each finger in the second plurality of fingers define restrictor features that are configured to keep electrical wiring that is threaded between the fingers in a known position. Each finger in the first plurality of fingers and each finger in the second plurality of fingers define a break-off point include a chamfered neck allowing the finger to be twisted off and removed from the first or second sidewalls.

The base plate defines an inner base rail and an outer base rail and wherein the first and second side walls define a locking feature received intermediate the inner and outer base rails. The base plate defines a plurality of score lines along the bottom of base plate to provide a mechanism for removal of a section of the inner base rail and the outer base rail. The base plate defines a plurality of cable duct mounting slots staggered to provide a variety of mounting points along the base plate. The base plate defines a plurality of cable tie mounting buckles configures to secure a wire cable to the base plate. The first sidewall and the second side walls are formed by an injection molding process and wherein edges of each finger in the first and second plurality of fingers are rounded.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Although the disclosure hereof is detailed and exact to enable those skilled in the art to practice the invention, the physical embodiments herein disclosed is merely a non-limiting example of the invention that may be embodied in another specific structure. While the preferred embodiment has been described, the details may be changed without departing from the invention. The invention contemplates the assembly of various cooperating components fabricated from molded or extruded resilient materials, such as an elastomeric polymer, preferably PVC. The components feature a snap-lock assembly of a combination saddle-lobe hinge mechanism. "Snap-lock" means, for example, the ability to assemble two components by hand, without requiring tools, and providing such positive engagement that the two components will not separate absent an applied force. Such an applied force may be applied by hand or by a tool, for example.

Figure 1:
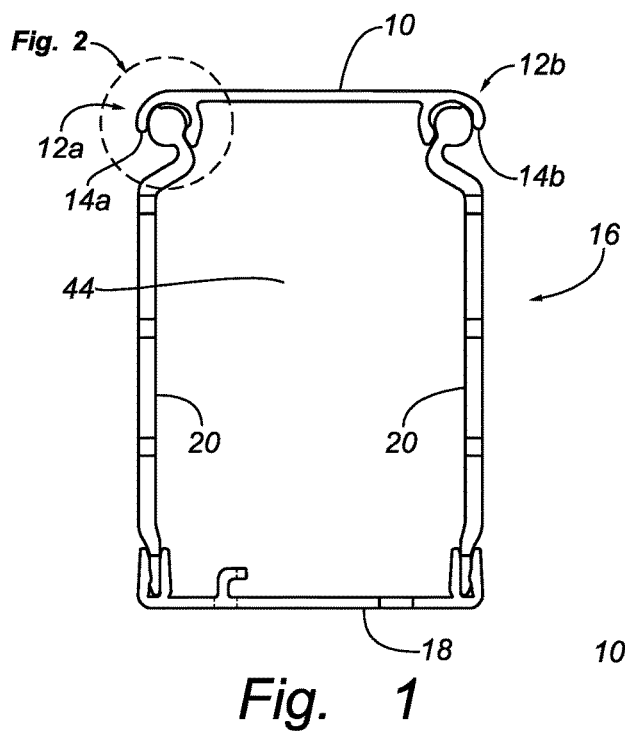
FIG. 1 is an end view of a closed cable duct according to an embodiment of the invention.

As shown in FIG. 1, a cable duct 16 includes a cover plate 10 with substantially identical and symmetrical first and second hinge mechanisms 12a,12b disposed on opposed distal edges 14a,14b of the cover plate 10. The cable duct 16 consists of a base plate 18, a pair of (first and second) sidewalls 20, and cover plate 10. The cover plate 10 rotates about either the first hinge mechanism 12a or the second hinge mechanism 12b to allow access to cables or anything else preferably stored within the cable duct 16. The saddle feature 24 on the distal edges 14a, 14b of the cover plate 10 snap onto the lobe mechanism 34 on the sidewalls 20. The saddle feature 24 on either distal edges 14a or 14b can be unsnapped from the lobe mechanism 34 to allow opening of the cover plate 10. The cover plate 10 pivots about the saddle feature 24 that remains attached to the lobe mechanism 34 on the respective sidewall 20 when the saddle feature 24 is unsnapped. The base plate 18 and the sidewalls 20 may be separate components or they may be integrally formed. The first and second sidewalls 20 are identical to one another and, as positioned in the base plate 18, are mirror images of each other.

Figure 2:
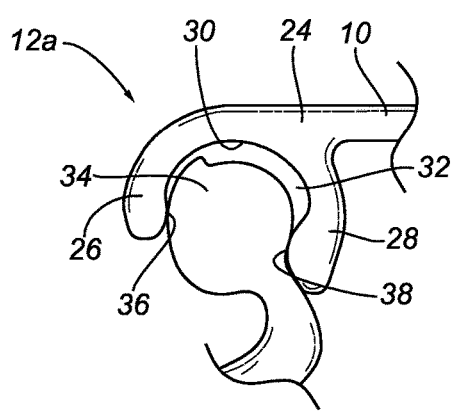
FIG. 2 is a partial enlargement of a hinge mechanism in the cable duct of FIG. 1 according to an embodiment of the invention.

With reference to FIG. 2, the first and second hinge mechanisms 12a, 12b of the cover plate 10 include a saddle shaped hinge feature, hereinafter referred to as the saddle feature 24 with a first saddle arm 26 and a second saddle arm 28. The first addle arm 26 extends in a planar fashion from the distal edges 14a. 14b of the cover plate 10, and the second saddle arm 28 extends substantially perpendicular to the cover plate 10, the first and second saddle arms 26, 28 form an arcuate shape 30 having a saddle cavity 32 configured to receive the lobe mechanism 34 of the sidewalls 20 (see FIG. 1). The first and second hinge mechanisms 12a, 12b are symmetrical and function in a substantially identical way. The first and second saddle arms 26, 28 include first and second projections 36, 38 respectively, both of which extend inward toward the saddle cavity 32 to contact the lobe mechanisms 34.

Figure 3:
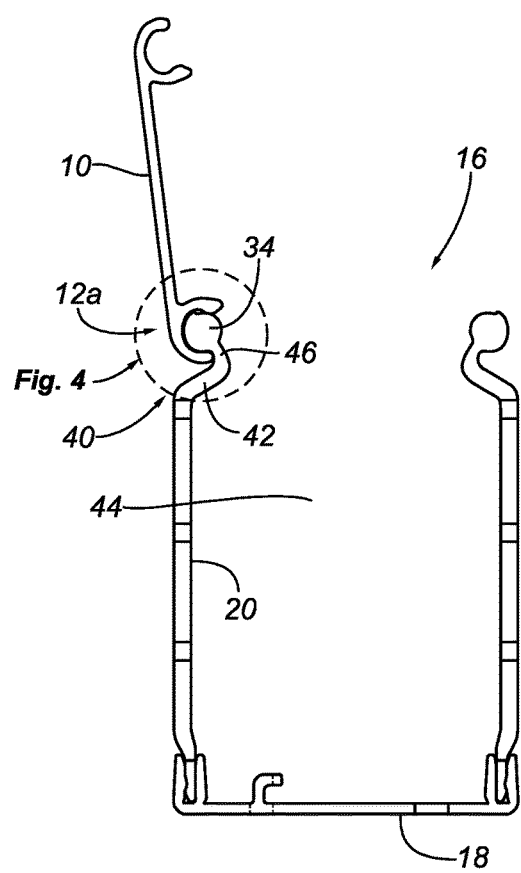
FIG. 3 is an end view of a cable duct with an open cover panel according to an embodiment of the invention.

Referring to FIG. 3, the sidewalls 20 include a first curved portion 42 on the distal ends 40 that is inwardly angled toward the center of the cable duct cavity 44, and a second curved portion 46 that distally curves outward away from the center of the cable duct cavity 44, the farthest distal ends of the sidewalls 20 completing in lobe mechanisms 34.

Figure 4:
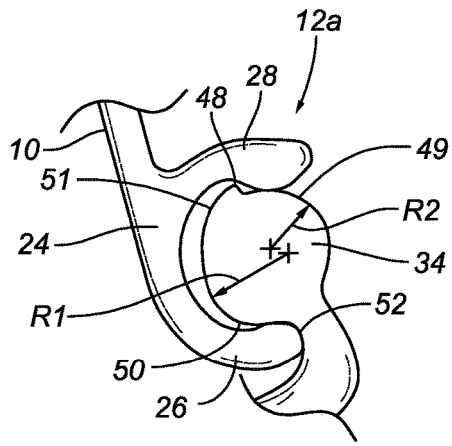
FIG. 4 is a partial enlargement of a hinge mechanism in the cable duct of FIG. 1 with the cover panel in a fully open position according to an embodiment of the invention.

As shown in FIG. 4, lobe mechanisms 34 are designed to be received between the first and second saddle arms 26, 28 of the saddle feature 24. The lobe mechanism 34 is designed with a detent step 48 on the upper or inner lobe portion 49 to prevent over-rotation of the cover plate 10 beyond 105° and a surface bulge 50 on the lower or outer lobe portion 51 to increase tension between the first and second saddle arms 26, 28 during rotation of the cover plate 10. The outer lobe portion 51 has a radius R1 that is greater than a radius R2 of the inner lobe portion 49. The longitudinal channel 52 underneath the lobe mechanism 34 on the outer face of the sidewall 20, created by the second curved portion 46 of the distal end 40 of the sidewall 20 (see FIG. 3), receives the first saddle arm 26 of the cover plate 10 when the cover plate 10 is in its full-open position. The cover plate 10 locks into place when either the first hinge mechanism 12a or the second hinge mechanism 12b is in the full open position to prevent inadvertent closure.

Figure 5A:
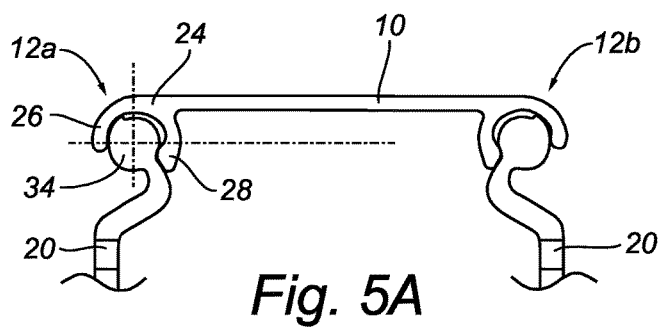
FIG. 5A is a partial enlargement of the cable duct of FIG. 1 with the cover panel in the fully closed position according to an embodiment of the invention.
Figure 5B:
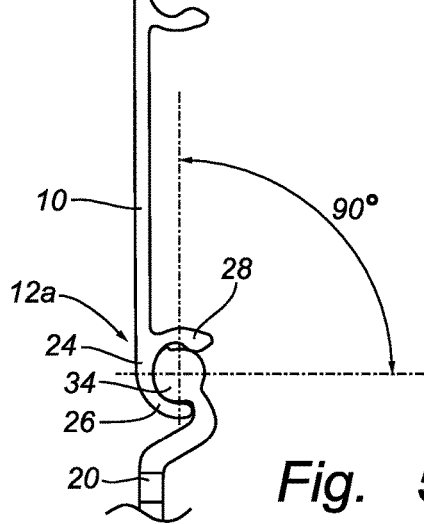
FIG. 5B is a partial enlargement of the cable duct cover of FIG. 1 with the cover panel partially open according to an embodiment of the invention.
Figure 5C:
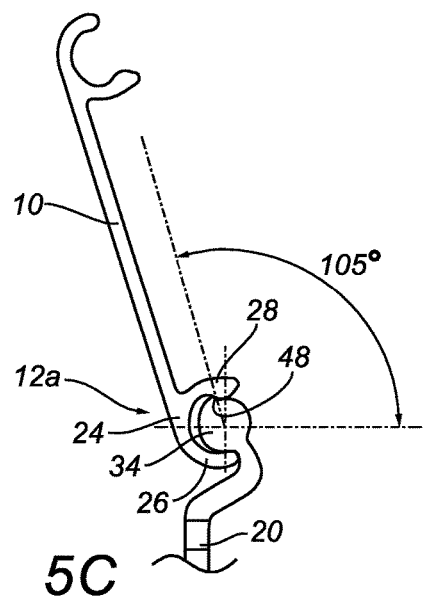
FIG. 5C is a partial enlargement of the cable duct of FIG. 1 with the cover panel in the fully open position according to an embodiment of the invention.

Referring to FIGS. 5a, 5b, and 5c, the first and second hinge mechanisms 12a, 12b, enable three phases (I, II, and III) of cover plate 10 rotation. In phase I, the first and second saddle arms 26, 28 are relaxed, and the cover plate 10 freely pivots about the saddle feature 24 of the cover plate 10 that remains attached. Phase I occurs between the fully closed position and a partially open position, e.g. an angle of rotation between 0° and 90°. Phase II occurs between the partially open position and the fully open position. In phase II, the first and second saddle arms 26, 28 are in tension as first saddle arm 26 pivots around the surface bulge 50 of lobe mechanism 34. The cover plate 10 is held open in any position of phase II. In phase III the cover plate 10 is in the fully open position. The second projection 38 on the second saddle arm 28 catches on the detent step 48, which limits rotation past fully open, e.g. 105°, and the first projection 36 on the first saddle arm 26 is received into the longitudinal channel 52. In the phase III, the cover plate 10 is locked in the fully open position. The locking mechanism is robust, yet defeatable with the application of a predetermined force. The resilient material of saddle feature 24 and lobe mechanism 34 facilitates repeated rotation through phases I through III without damage to either the first hinge mechanism 12a or the second hinge mechanism 12b.

Figure 8:
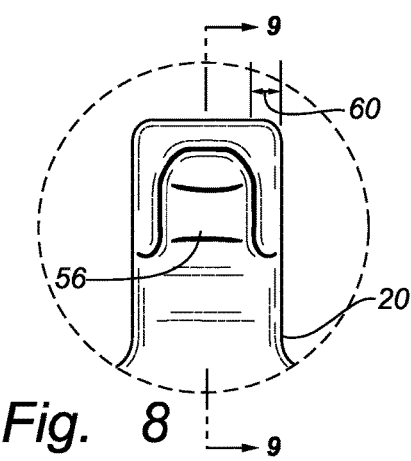
FIG. 8 is a partial enlargement of the cable duct of FIG. 6 showing a front view of the hollowed lobe structure according to another embodiment of the invention.
Figure 9:
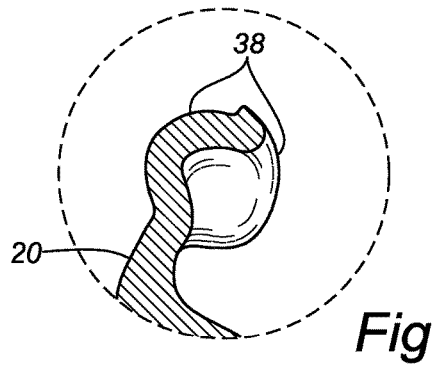
FIG. 9 is a partial enlargement of the cable duct of FIG. 6 showing a side profile of the hollowed lobe structure according to another embodiment of the invention.

As shown in FIGS. 8 and 9, another non-limiting example of the lobe mechanism 34, hereinafter referred to as a hollowed lobe 54, can be seen. The hollowed lobes 54 contain a hollowed out section 56. The hollowed lobes 54 retain the same profile 58 as lobe mechanisms 34, and the hollowed lobes 54 function identically to lobe mechanisms 34. The hollowed lobes 54 have a uniform wall thickness 60 for increased flow performance when the sidewalls 20 are molded using an injection molding process. The uniform wall thickness 60 of the hollowed lobes 54 generates less heat buildup in the mold, translating to shorter production cycle times as well as a reduction in the amount of plastic required to form the hollowed lobes 54.

Figure 7:
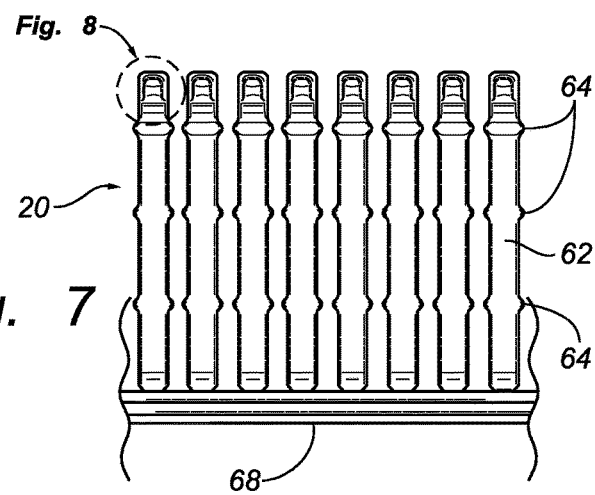
FIG. 7 is a side view of the cable duct sidewall structure of FIG. 1 according to another embodiment of the invention.
Figure 10:
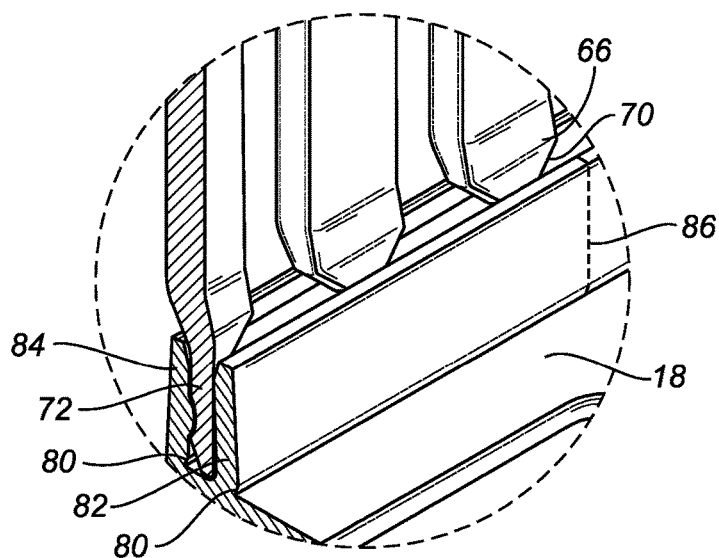
FIG. 10 is a partial enlargement of the cable duct of FIG. 1, the sidewall mating with the base plate therein according to another embodiment of the invention.

Referring to FIGS. 7 and 10, the sidewalls 20 are comprised of fingers 62, which have restrictors 64 that keep cables, or any other electrical wiring that is threaded between the fingers 62 in a known position. Fingers 62 have break-off points 66 at the base plate 18 where the fingers 62 connect to an injection molded finger stem 68. The break-off points 66 include a chamfered neck 70, allowing the fingers 62 to be easily twisted off and removed from the finger stem 68, providing an additional space for cables to run through the sidewalls 20. When the fingers 62 are twisted off, the fingers 62 break off below the top of inner base rail 82 and outer base rail 84, leaving no material sticking up that could catch on cables that may be running between the fingers 62. This helps to prevents exposure of sharp edges that could damage a cable. The finger stem 68 has a locking feature 72 that allows easy insertion of the sidewalls 20 between inner base rail 82 and outer base rail 84 on base plate 18 while also increasing pull out resistance.

According to an alternative embodiment the fingers contain a hollowed out section extending vertically along the fingers. The hollowed fingers reduce the amount of plastic required to form the fingers, thereby providing cost and weight savings for the cable duct.

Accordingly, a cable duct is provided. The hinge mechanisms provide the benefits of allowing the cover plate to open from either side, The hinge mechanism also provides three phases of cover plate 10 rotation. In phase I, e.g. between 0° and 90° rotation, the cover plate pivots freely. In phase II between the partially open position and the fully open position, e.g. between 90° and 105° rotation, the cover plate is held open in the established cover plate position. In phase III, the cover plate is in the fully open position. The modular design of the cable duct provides improved ease of assembly, repair, and customization of the cable duct compared to prior cable duct designs.

Figure 6:
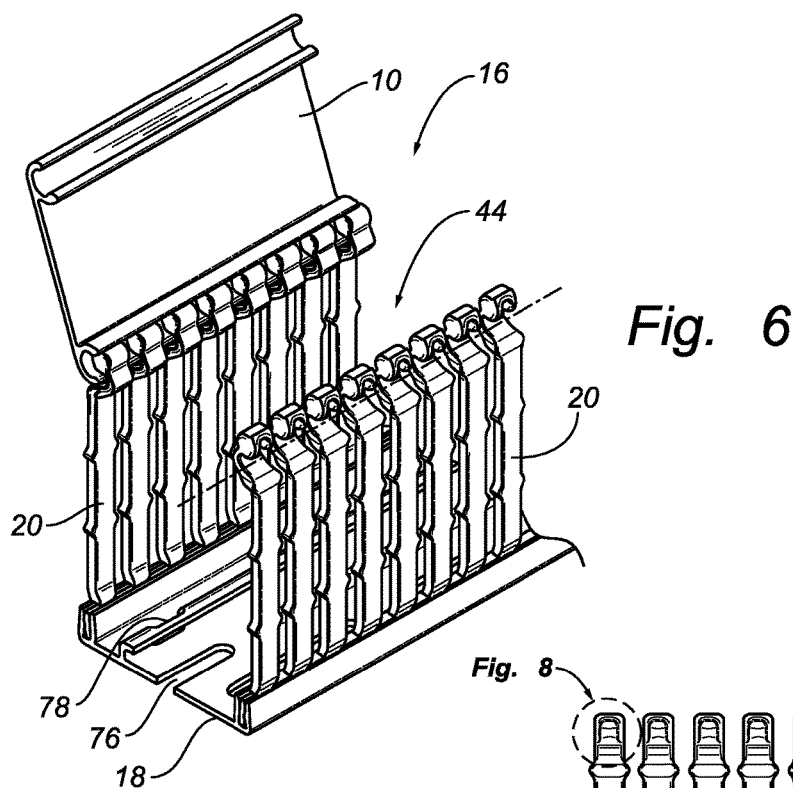
FIG. 6 is a perspective view of the cable duct with a hollowed lobe mechanism according to another embodiment of the invention.
Figure 11:
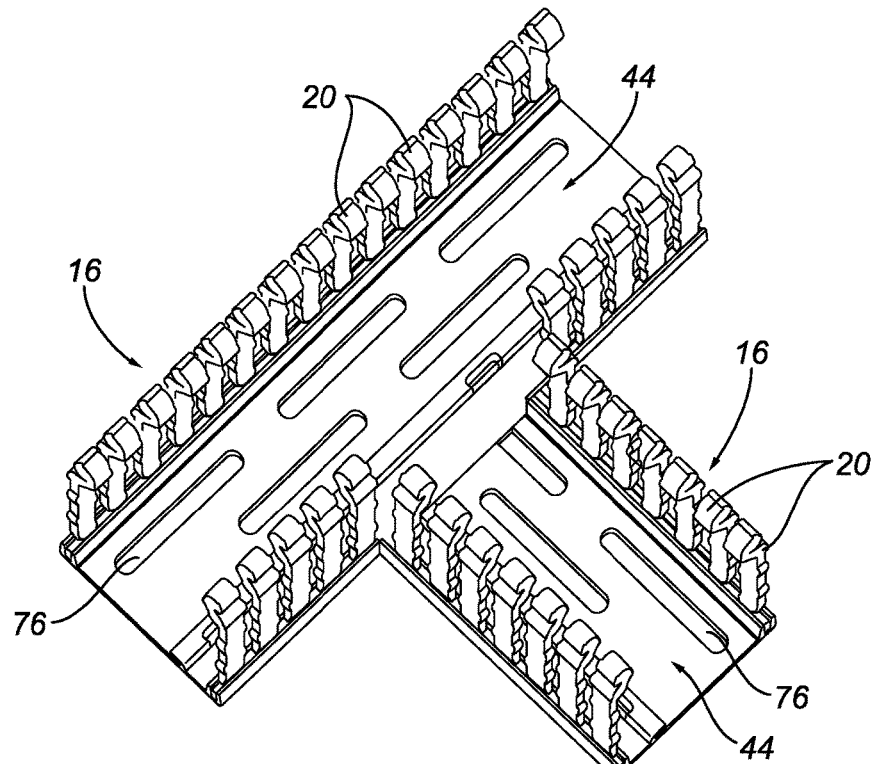
FIG. 11 is a perspective view of a plurality of cable duct cable ducts of FIG. 1, abutting to form a larger cable duct therein according to another embodiment of the invention.

Referring to FIGS. 6 and 10, base plate 18 includes cable duct mounting slots 76, cable tie mounting buckles 78, and score lines 80. Cable duct mounting slots 76 are staggered to create a variety of mounting points throughout the length of the base plate 18. The cable tie mounting buckles 78 retain any variety of frequent wire and cables placed underneath the cable tie mounting buckle 78. Vertical cuts 86 can be made into the inner base rail 82 and outer base rail 84 to remove segments of the inner base rail 82 and outer base rail 84. Score lines 80 along the bottom of base plate 18 create an easy mechanism for removal of any section of the inner base rail 82 and outer base rail 84, after vertical cuts 86 have been made, to provide a smooth surface for intersection with T-intersecting cable ducts (shown in FIG. 11).

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

The examples presented herein are directed to cable ducts configured to retain electrical wiring. However, other embodiments of the cable duct may be envisioned that are adapted for use with fiber optic cables, pneumatic lines, hydraulic lines, or a combination of any of these.

While this invention has been described in terms of the preferred embodiments thereof, it is not intended to be so limited, but rather only to the extent set forth in the claims that follow. Moreover, the use of the terms first, second, upper, lower, etc. does not denote any order of importance or orientation, but rather the terms first, second, upper, lower, etc. are used to distinguish one element from another. Furthermore, the use of the terms a, an, etc. do not denote a limitation of quantity, but rather denote the presence of at least one of the referenced items.

I claim:

1. A cable duct defining a cavity configured to retain an elongate conductor, comprising:
    a cover plate defining a first saddle feature longitudinally extending along a first distal edge of the cover plate and a second saddle feature longitudinally extending along a second distal edge of the cover plate opposite the first distal edge;
    a base plate arranged opposite the cover plate;
    a first sidewall extending from a longitudinal edge of the base plate to the cover plate, wherein the first sidewall defines a first lobe mechanism on a first sidewall end opposite the base plate configured to engage the first saddle feature and releasably secure the cover plate to the first sidewall, wherein the first saddle feature is configured to pivot about the first lobe mechanism; and
    a second sidewall extending from another longitudinal edge of the base plate to the cover plate, wherein the second sidewall defines a second lobe mechanism on a second sidewall end opposite the base plate configured to engage the second saddle feature and releasably secure the cover plate to the second sidewall, wherein the second saddle feature is configured to pivot about the second lobe mechanism, wherein each of the first and second lobe mechanisms include a rounded outer lobe portion having a first radius and a rounded inner lobe portion having a second radius, and wherein the first radius is greater than the second radius, wherein the first lobe mechanism is a mirror-image of the second lobe mechanism and the first saddle feature is a mirror image of the first saddle feature, and wherein the first lobe mechanism defines a detent step intermediate the rounded outer lobe portion and the rounded inner lobe portion to prevent over-rotation of the cover plate beyond an angular limit.

2. The cable duct according to claim 1, wherein the first lobe mechanism is attached to the first sidewall by a serpentine portion having a first curved portion that is inwardly angled toward a center of the cable duct and a second curved portion that curves outwardly away from the center of the cable duct.

3. The cable duct according to claim 2, wherein the serpentine portion defines a longitudinal channel intermediate the first sidewall and the first lobe mechanism.

4. The cable duct according to claim 3, wherein the first saddle feature is characterized as having a C-shape and defines a first saddle arm and a second saddle arm and wherein the first lobe mechanism is received in a saddle cavity defined between the first and second saddle arms.

5. The cable duct according to claim 4, wherein the first saddle feature is configured to pivot from a closed position in which the first lobe mechanism is engaged with the first saddle feature and the second lobe mechanism is in contact with, but not engaged with, the second saddle feature to a partially open position in which the second lobe mechanism is disengaged from the second saddle feature and an end of the first saddle arm is disposed within the longitudinal channel and wherein a first force is required to be applied to the cover plate to move the first saddle feature from the closed position to the partially open position.

6. The cable duct according to claim 5, wherein the first and second saddle arms are not in tension as the first saddle feature is moved from the closed position to the partially open position.

7. The cable duct according to claim 5, the first saddle feature rotates through an angle of about 90 degrees between a locked position, in which the first lobe mechanism is engaged with the first saddle feature and the second lobe mechanism is engaged with the second saddle feature, and the partially open position.

8. The cable duct according to claim 5, wherein the first saddle feature is configured to pivot from the partially open position to a fully open position in which an end of the second saddle arm is in contact with the detent step and the end of the first saddle arm is disposed within the longitudinal channel and wherein a second force, greater than the first force, is required to be applied to the cover plate to move the first saddle feature from the partially open position to the fully open position.

9. The cable duct according to claim 8, wherein the first and second saddle arms are in tension as the first saddle feature is moved from the partially open position to the fully open position.

10. The cable duct according to claim 8, the first saddle feature rotates through an angle of about 105 degrees between a locked position, in which the first lobe mechanism is engaged with the first saddle feature and the second lobe mechanism is engaged with the second saddle feature, and the fully open position.

11. The cable duct according to claim 1, wherein the second lobe mechanism defines a detent step intermediate the rounded outer lobe portion and the rounded inner lobe portion to prevent over-rotation of the cover plate beyond the angular limit.

12. The cable duct according to claim 11, wherein the second lobe mechanism is attached to the second sidewall by a serpentine portion having a first curved portion that is inwardly angled toward a center of the cable duct and a second curved portion that curves outwardly away from the center of the cable duct.

13. The cable duct according to claim 12, wherein the serpentine portion defines a longitudinal channel intermediate the second sidewall and the second lobe mechanism.

14. The cable duct according to claim 13, wherein the second saddle feature is characterized as having a C-shape and defines a first saddle arm and a second saddle arm and wherein the second lobe mechanism is received in a saddle cavity defined between the first and second saddle arms.

15. The cable duct according to claim 14, wherein the second saddle feature is configured to pivot from a closed position in which the second lobe mechanism is engaged with the second saddle feature and the first lobe mechanism is in contact with, but not engaged with, the first saddle feature to a partially open position in which the second lobe mechanism is disengaged from the second saddle feature and an end of the second saddle arm is disposed within the longitudinal channel and wherein a first force is required to be applied to the cover plate to move the second saddle feature from the closed position to the partially open position.

16. The cable duct according to claim 15, wherein the first and second saddle arms are not in tension as the second saddle feature is moved from the closed position to the partially open position.

17. The cable duct according to claim 15, the second saddle feature rotates through an angle of about 90 degrees between a locked position, in which the second lobe mechanism is engaged with the second saddle feature and the first lobe mechanism is engaged with the first saddle feature, and the partially open position.

18. The cable duct according to claim 15, wherein the second saddle feature is configured to pivot from the partially open position to a fully open position in which an end of the second saddle arm is in contact with the detent step and the end of the first saddle arm is disposed within the longitudinal channel and wherein a second force, greater than the first force, is required to be applied to the cover plate to move the second saddle feature from the partially open position to the fully open position.

19. The cable duct according to claim 18, the second saddle feature rotates through an angle of about 105 degrees between a locked position, in which the second lobe mechanism is engaged with the second saddle feature and the second lobe mechanism is engaged with the second saddle feature, and the fully open position.

20. The cable duct according to claim 18, wherein the first and second saddle arms are in tension as the first saddle feature is moved from the partially open position to the fully open position.

21. The cable duct according to claim 1, wherein the first sidewall comprises a first plurality of fingers defining a gap therebetween, each finger in the first plurality of fingers defining the first lobe mechanism on a first finger end opposite the base plate and wherein the second sidewall comprises a second plurality of fingers defining a gap therebetween, each finger in the second plurality of fingers defining the second lobe mechanism on a second finger end opposite the base plate.

22. The cable duct according to claim 21, wherein each first lobe mechanism and each second lobe mechanism contains a hollowed out section such that the hollowed first and second lobe mechanisms have a uniform wall thickness.

23. The cable duct according to claim 21, wherein each finger in the first plurality of fingers and each finger in the second plurality of fingers define restrictor features configured to keep electrical wiring that is threaded between the fingers in a known position.

24. The cable duct according to claim 21, wherein each finger in the first plurality of fingers and each finger in the second plurality of fingers define a break-off point include a chamfered neck allowing the finger to be twisted off and removed from the first or second sidewalls.

25. The cable duct according to claim 21, wherein the base plate defines an inner base rail and an outer base rail and wherein the first and second side walls define a locking feature received intermediate the inner and outer base rails.

26. The cable duct according to claim 25, wherein the base plate defines a plurality of score lines along the bottom of base plate to provide a mechanism for removal of a section of the inner base rail and the outer base rail.

27. The cable duct according to claim 21, wherein the base plate defines a plurality of cable duct mounting slots staggered to provide a variety of mounting points along the base plate.

28. The cable duct according to claim 21, wherein the base plate defines a plurality of cable tie mounting buckles configures to secure a wire cable to the base plate.

29. The cable duct according to claim 21, wherein the first sidewall and the second side walls are formed by an injection molding process and wherein edges of each finger in the first and second plurality of fingers are rounded.

30. A cable duct defining a cavity configured to retain an elongate conductor, comprising:
  a cover plate defining a first hinge mechanism longitudinally extending along a first distal edge of the cover plate and a second hinge mechanism longitudinally extending along a second distal edge of the cover plate opposite the first distal edge;
  a base plate arranged opposite the cover plate;
  a first sidewall-comprising a first plurality of fingers defining a gap therebetween extending from a longitudinal edge of the base plate to the cover plate, wherein each of said first plurality of fingers defines a first lobe mechanism on a first finger end of the first plurality of fingers opposite the base plate configured to engage the first hinge mechanism and releasably secure the cover plate to the first sidewall, wherein the first hinge mechanism is configured to pivot about the first lobe mechanisms; and a second sidewall comprising a second plurality of fingers defining a gap therebetween extending from another longitudinal edge of the base plate to the cover plate, wherein each of said second plurality of fingers defines a second lobe mechanism on a second finger end of the second plurality of fingers opposite the base plate configured to engage the second hinge mechanism and releasably secure the cover plate to the second sidewall, wherein the second hinge mechanism is configured to pivot about the second lobe mechanisms, wherein each of said first plurality of fingers and each of said second plurality of fingers define a break-off point including a chamfered neck allowing each of the fingers of the first fingers and the second fingers to be twisted off and removed from the first or second sidewalls.

31. The cable duct according to claim 30, wherein each of the fingers of the first fingers and the second fingers define restrictor features configured to keep electrical wiring that is threaded between the fingers of the first fingers and the second fingers in a known position.

32. The cable duct according to claim 30, wherein the base plate defines an inner base rail and an outer base rail and wherein the first and second side walls define a locking feature received intermediate the inner and outer base rails.

33. The cable duct according to claim 32, wherein the base plate defines a plurality of score lines along the bottom of base plate to provide a mechanism for removal of a section of the inner base rail and the outer base rail.

34. The cable duct according to claim 30, wherein the base plate defines a plurality of cable duct mounting slots staggered to provide a variety of mounting points along the base plate.

35. The cable duct according to claim 30, wherein the base plate defines a plurality of cable tie mounting buckles configured to secure a wire cable to the base plate.

36. The cable duct according to claim 30, wherein the first sidewall and the second side walls are formed by an injection molding process and wherein edges of each finger in the first and second plurality of fingers are rounded.

* * * * *